United States Patent
Wang et al.

(10) Patent No.: US 10,593,055 B2
(45) Date of Patent: Mar. 17, 2020

(54) METHOD AND APPARATUS FOR CAPTURING IMAGES AND ASSOCIATED 3D MODEL BASED ON A SINGLE IMAGE SENSOR AND STRUCTURED-LIGHT PATTERNS IN THE VISIBLE SPECTRUM

(71) Applicant: CAPSOVISION, Inc., Saratoga, CA (US)

(72) Inventors: Kang-Huai Wang, Saratoga, CA (US); Gordon C. Wilson, San Francisco, CA (US); Mark A. Hadley, Los Altos, CA (US)

(73) Assignee: CAPSOVISION INC, Saratoga, CA (US)

( * ) Notice: Subject to any disclaimer, the term of this patent is extended or adjusted under 35 U.S.C. 154(b) by 173 days.

(21) Appl. No.: 15/933,375

(22) Filed: Mar. 23, 2018

(65) Prior Publication Data
US 2019/0295279 A1    Sep. 26, 2019

(51) Int. Cl.
| | | |
|---|---|---|
| G06K 9/00 | (2006.01) |
| G06T 7/586 | (2017.01) |
| G01B 11/25 | (2006.01) |
| H04N 5/232 | (2006.01) |

(52) U.S. Cl.
CPC .......... *G06T 7/586* (2017.01); *G01B 11/2518* (2013.01); *H04N 5/23229* (2013.01); *G06T 2200/08* (2013.01)

(58) Field of Classification Search
USPC .................................. 382/154, 106, E5.137
See application file for complete search history.

(56) References Cited

U.S. PATENT DOCUMENTS

| | | | | |
|---|---|---|---|---|
| 6,441,888 B1* | 8/2002 | Azuma | ............... | G01S 7/481 356/4.01 |
| 2005/0254726 A1* | 11/2005 | Fuchs | ............... | H04N 5/74 382/285 |
| 2010/0304854 A1* | 12/2010 | McEldowney | ...... | G06K 9/2027 463/30 |
| 2011/0270562 A1* | 11/2011 | Ito | ............... | G01B 11/25 702/94 |
| 2014/0241614 A1* | 8/2014 | Lee | ............... | H04N 13/254 382/154 |
| 2016/0098841 A1* | 4/2016 | Sekiguchi | ............ | H04N 13/239 382/106 |
| 2016/0112631 A1* | 4/2016 | Ackley | .............. | H04N 5/23222 348/207.11 |
| 2018/0336691 A1* | 11/2018 | Suzuki | ............... | G01B 21/045 |

\* cited by examiner

*Primary Examiner* — Kathleen Y Dulaney

(57) ABSTRACT

A method and apparatus of capturing non-structured light images and structured light images for deriving depth information are disclosed. According to the method, one or more non-SL (non-structured light) images without structured light and one or more initial SL (structured light) images formed on a common image plane are captured by projecting structured light patterns in a visible spectrum with the structured light source adjusted to generate initial structured light at an initial intensity level. The signal quality of structured light patterns reflected from one or more objects is evaluated based on the non-SL images and the initial SL images. If the signal quality of structured light patterns is below a threshold, a next set of SL images are captured by increasing the structured light level from a previous level until the signal of the structured light patterns is satisfactory.

30 Claims, 3 Drawing Sheets

METHOD AND APPARATUS FOR CAPTURING IMAGES AND ASSOCIATED 3D MODEL BASED ON A SINGLE IMAGE SENSOR AND STRUCTURED-LIGHT PATTERNS IN THE VISIBLE SPECTRUM

CROSS REFERENCE TO RELATED APPLICATIONS

The present invention is related to U.S. patent application Ser. No. 14/884,788, filed on Oct. 16, 2015. The U.S. Patent Applications is hereby incorporated by reference in its entirety.

FIELD OF THE INVENTION

The present invention relates to capturing images and associated 3D model by illuminating objects with structured-light patterns. In particular, the present invention addresses the low cost solution targeted for applications in a non-static environment and having a constraint of no or just a little disturbing structured light (SL).

BACKGROUND AND RELATED ART

In recent years, three-dimensional (3D) imaging has found various applications, such as virtual-reality visualization, manufacturing, machine vision, surgical models, authentication, etc. The 3D images may be captured using a regular camera for the texture information and a separate depth camera (e.g. Time of Flight camera) for the depth information of objects in the scene in the field of view. The 3D images may also be captured using multiple cameras, where multiple cameras are often used in a planar configuration to capture a scene from different viewing angles. Point correspondence is then established among multiple views for 3D triangulation.

Another 3D imaging technology, named structured light technology, has been developed to derive the depth or shape of objects in the scene using a single camera. In the structured light (SL) system, one or more light sources and a projector are often used to project known geometric pattern(s) onto objects in the scene. A regular camera can be used to capture images with and without the projected patterns. The images captured with and without the structured light can be used to derive the shapes associated with the objects in the scene. The depth or shape information is then used for the regular images, which are captured without structured light, to create 3D textured model of the objects. The structured light technology has been well known in the field. For example, in "*Structured-light 3D surface imaging: a tutorial*" (Geng, in *Advances in Optics and Photonics*, Vol. 3, Issue 2, pp. 128-160, Mar. 31, 2011), structured light technology using various structured light patterns are described and the corresponding performances are compared. In another example, various design, calibration and implement issues are described in "3-D Computer Vision Using Structured Light: Design, Calibration and Implementation Issues" (DePiero et al., *Advances in Computers*, Volume 43, Jan. 1, 1996, pages 243-278). In U.S. Pat. No. 8,493,496, issued on Jul. 23, 2013, a method and apparatus for mapping an object are disclosed. According to U.S. Pat. No. 8,493,496, a transparency containing a plurality of micro-lenses is arranged in a non-uniform pattern. A light source, which is configured to trans-illuminate the transparency with optical radiation and the micro-lenses are configured to focus the optical radiation to form, at a focal plane, respective focal spots in a non-uniform pattern. An image sensor captures an image of the pattern that is projected onto the object for reconstructing a 3D map of the object. The details of the structured light technology are well-known in the field and therefore the details are not repeated here.

Recently, structured light imaging has been used for facial recognition as an authentication method for a user to unlock a mobile device such as a smart phone. The structured light 3D system is often intended for mapping an object in a static environment, where the object is stationary. Furthermore, in order to derive reliable 3D model, the structured-light images are often captured using a structured light at much higher intensities than the ambient light. Therefore, the conventional structured light imaging approach may not suitable for the 3D facial recognition in mobile device since the strong structured light is not only disturbing, but also raises eye safety concerns. In order to overcome the issues, a system introduced to the market uses dedicated camera to capture structured-light images. Furthermore, near-infrared light sources are used to project the structured-light patterns to avoid or reduce disturbance to the subject during structured-light image capture. For example, iPhone X™ recently introduced by Apple Inc.™ incorporates a structured-light transmitter using a VCSEL (vertical-cavity surface-emitting laser) as a light source to project 30,000 dots onto an object (Zac Hall, "*iPhone X's one design limitation rumored to be improved next year*", 9to5Mac Online Article, Jan. 16, 2018, https://9to5mac.com/2018/01/16/iphone-12-almost-notch-less/). A structured light receiver comprising a 1.4 MP CMOS (complementary metal-oxide-semiconductor) sensor with a near-infrared filter is used to capture structured light images. Furthermore, iPhone X™ includes a flood illuminator (Alex Webb and Sam Kin, "*Inside Apple's Struggle to Get the iPhone X to Market on Time*", Bloomberg Technology, Oct. 25, 2017, https://www.bloomberg.com/news/articles/2017-10-25/inside-apple-s-struggle-to-get-the-iphone-x-to-market-on-time+&cd=1&hl=en&ct=clnk&gl=us), which beams an infrared light for the infrared camera to establish the presence of a face. While the use of a separate sensor and light source in the non-visible light spectrum provides a reliable means for capturing structured light images, the solution is quite costly due to the additional components required (i.e., the dot projector/VCSEL light source, the flood illuminator and the infrared camera). FIG. 1 illustrates an example of the mobile phone 100 in the market with the structured light for face recognition, where the dot projector/VCSEL light source 110, an infrared camera 120, a flood illuminator 130 and a front camera 140 are shown.

For any consumer application, the cost is a very sensitive factor to take into consideration. It is desirable to develop 3D structured light imaging systems with reduced components while maintaining the quality and accuracy as the system with a separate structured light projector and separate structured light image sensor, and without causing noticeable disturbance to the subject.

BRIEF SUMMARY OF THE INVENTION

A method and apparatus of capturing images of a scene using a camera comprising an image sensor and one or more structured light sources for deriving depth information are disclosed. According to the method, one or more non-SL (non-structured light) images formed on a common image plane are captured using the image sensor during one or more first frame periods without any structured light source on. One or more initial SL (structured light) images formed on the common image plane are captured using the image camera during one or more second periods by projecting structured light patterns in a visible spectrum with said one or more structured light source adjusted to generate initial structured light at one or more initial intensity levels. The signal quality of structured light patterns reflected from one or more objects in a field of view of the image sensor is evaluated based on said one or more non-SL images and said one or more initial SL images. If the signal quality of structured light patterns is below a threshold, repeating following steps until the signal quality of structured light patterns is equal to or above the threshold: selecting one or more target intensity levels from a range or a group comprising one target intensity level higher than at least one previous intensity level for said one or more structured light sources; capturing one or more next SL images formed on the common image plane as one or more target SL images during one or more third periods by projecting the structured light patterns in the visible spectrum with said one or more target intensity levels selected; and evaluating signal quality of structured light patterns reflected from one or more objects in the field of view of the image sensor based on said one or more non-SL images and said one or more target SL images. If the signal quality of structured light patterns is satisfactory, said one or more non-SL images and one or more final target SL images are provided, where said one or more final target SL images correspond to said one or more target SL images captured in a last iteration.

The method may further comprise capturing, by the image sensor, a regular image formed on the common image plane using the image sensor during a regular frame period by setting the image sensor to a regular mode without any structured light source on, wherein said one or more first frame periods, said one or more second periods and said one or more third periods may be substantially less than the regular frame period. For example, said one or more first frame periods, said one or more second periods and said one or more third periods are equal to or less than ⅛ of the regular frame period.

In one embodiment, the image sensor is set to a fast-capture mode during capturing said one or more non-SL images, said one or more initial SL images and said one or more next SL images referred to as fast-mode images to cause said one or more first frame periods, said one or more second periods and said one or more third periods substantially shorter than a regular frame period used to capture a regular image by the image sensor. The fast capture mode may correspond to setting the image sensor by reducing bit depth associated with analog-to-digital converter (ADC) of the image sensor or spatial resolution, or increasing readout gain of the image sensor with reference to the regular mode. The fast-capture mode may also correspond to reducing spatial resolution of the image sensor by setting the image sensor to reduce spatial resolution by binning neighboring sensor pixels of a same color.

In one embodiment, said evaluating the signal quality of structured light patterns reflected from one or more objects in a field of view of the image sensor comprises evaluating signal-to-noise ratio, average signal or peak signal of the structured light patterns reflected from one or more objects in a field of view of the image sensor.

In one embodiment, said one or more structured light sources comprise multiple light sources with different spectral densities, and said multiple light sources are adjusted to maximize structured light to ambient-light signal ratio among color planes of the image sensor.

In one embodiment, said one or more initial intensity levels are determined according to image intensities of said one or more non-SL images and distance information between the camera and a target object detected by a distance sensor. In another embodiment, said one or more initial intensity levels are determined according to ambient light information from an ambient light sensor and distance information.

The method may further comprise applying averaging, median filter or outlier rejection to said one or more non-SL images to derive an enhanced non-SL image, applying averaging, median filter or outlier rejection to said one or more initial SL images to derive a processed initial SL image and applying averaging, median filter or outlier rejection to said one or more target SL images to derive an enhanced SL image. The signal quality of structured light patterns reflected from one or more objects in the field of view of the image sensor is evaluated based on the enhanced non-SL image and the processed initial SL image, or based on the enhanced non-SL image and the enhanced SL image. The method may further comprise deriving depth information for one or more objects in the field of view of the image sensor based on differences between the enhanced non-SL image and the enhanced SL image.

DETAILED DESCRIPTION OF THE INVENTION

Figure 1:
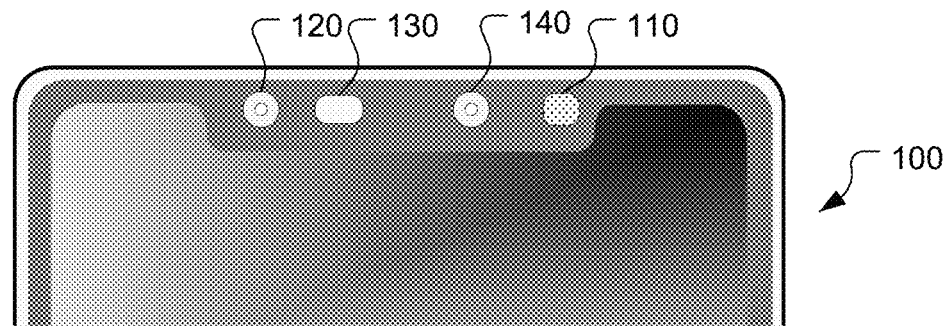
FIG. 1 illustrates an example of the mobile phone in the market with the structured light for face recognition, where the dot projector/VCSEL light source, an infrared camera, a flood illuminator and a front camera are shown.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

As mentioned above, for certain structured light applications, it is desirable to cause the structured light imperceptible so as not to disturb the subject, whose image being captured for 3D mapping. The conventional structured light systems often use bright laser source to project structured patterns, which works fine for static objects. Nevertheless, such systems may not be suitable for human subjects for safety concerns since the bright light may harm subject's eyes. Furthermore, a subject may be in motion and there may be substantial differences between structured light (SL) image and a corresponding regular image of the subject.

One solution being practiced in the field utilizes imperceptible light source in the infrared or near infrared band along with a matching image sensor to capture images in the imperceptible light band. While this system works satisfactorily, it increases system cost due to additional components required (e.g. the matching image sensor and infrared light source). Therefore, it is desirable to develop a low cost system that can reliably capture 3D information of an object (e.g. a human subject) without causing noticeable disturbance to the object. Besides capturing the 3D information of the subject, it is also desirable to capture an image of the object in good quality. The 3D information of the object can be correlated with the object for various applications. For example, the object may correspond to a human subject's face and the 3D face information can be used for authentication of the subject by matching the current derived 3D face information with previously stored 3D face information of the subject.

Recently, a smartphone based 3D mapping system has been disclosed by Gao et al. ("A smartphone-based laser distance sensor for outdoor environments", 2016 IEEE International Conference on Robotics and Automation (ICRA), Stockholm, Sweden, May 16-21, 2016, pp. 2922-2929), where a line laser is used as the structured light source, a bandpass filter is used to reduce the ambient light flux, and a CMOS image sensor is used to capture laser illumination reflected off objects. The object distance from the camera is derived by using the processing resources of the smartphone. The system is capable of detecting object distances in ambient light and sunlight conditions. One targeted application is LDS (laser distance system) for robotic vehicles. While the system can achieve low cost, it is mainly used for detecting distances of objects (e.g. obstacles) and doesn't care much for possible disturbance to subjects beyond eye safety level. Furthermore, the image sensor for capturing images corresponding to laser illumination reflected off objects is not used for capturing regular image since the LDS mainly cares for the object distances that may be obstacles to the vehicle. Instead, the smartphone has a built-in high-quality image sensor for capturing regular images/videos. Therefore, the system by Gao et al. does not solve the issue of low cost system for capturing structured light images and regular images without projecting disturbing structured light.

In the present invention, a low cost system that captures structured light (SL) images and regular images using the same image sensor without projecting very noticeable disturbing structured light. In a camera, the image sensor is positioned in the image plane where the camera optic projects a scene in the field of view (FOV) onto. When the same image sensor is used, the scene in the FOV is projected to the same image plane regardless of structured light image or regular image. Furthermore, it is intended for applications that the object (e.g. human subject) may be non-stationary. For the present system, the same image sensor is used to capture structured light images as well as regular images. In U.S. patent application Ser. No. 14/884,788, a capsule camera capturing structured light images and regular images using the same image sensor is disclosed. In the human gastrointestinal environment, there is no ambient light. Therefore, the structured light image along can be used to derive the 3D information, such as depth and shape of an object. For the current intended application, the ambient light often exists and may even correspond to strong sunlight. Therefore, when a structured light image is captured, the image corresponds to a mixture of an image corresponding to the structured light and an image corresponding to the ambient light. In order to derive 3D information using the structured light, an image without the structured light (i.e., the image corresponding to ambient light only) needs to be captured as well. Accordingly, structured light specific image (i.e., corresponding reflected structured light from the object in the scene) can be derived from the difference of these two images if the scene is stationary. In the case that a structured light source in the visible band is used, the light intensity from the structured light has to be high enough so that the structured light patterns can be detected. Under the ambient light environment, if there is no motion or little motion between the captured image with structured light and the captured image without structured light, a difference between the two images reveals the structured light reflected from the object. The image captured with the structured light is referred as an SL image and the image captured without the structured light is referred as a non-SL image in this disclosure. The depth of objects in the field of view (FOV) of the camera can be derived from the structured light patterns reflected from the objects. For example, the difference image between the SL image and the non-SL image can be used to derive the 3D information of the. The phrase "with the structured light" in this disclosure refers the case that the structured light is on. The phrase "without the structured light" in this disclosure refers the case that the structured light is off. Furthermore, the case that the structured light is off also includes the case that the structured light is substantially off, such as only 10% or less of the intended intensity.

In order to minimize the possible disturbance that the structured light in the visible light spectrum may cause to a subject, the present invention discloses a method that captures a non-SL image and an initial test SL images by setting an initial low-intensity structured light. The structured light patterns reflected from objects in the field of view of the camera can be derived from the non-SL image and the initial test SL image. The quality of the structured light patterns reflected from objects is checked. If the quality of the structured light patterns reflected from objects is not good enough, the intensity of the structured light sources is then selected to be one intensity level increased from a previous intensity level until the quality of the structured light patterns reflected from objects is good enough, such as the difference between SL image and non-SL image can enable the processor to reliably detect the structure light patterns. In each step, a new test SL image is captured and the structured light patterns reflected from objects in the field of view of the camera can be derived again from the non-SL image and the new test SL image. In one example, the intensity of the structured light sources can be selected to be successively increasing. In this case, the procedure of increasing the intensity of the structured light sources, capturing a new SL image, deriving the structured light patterns reflected from objects and checking the quality of the structured light patterns reflected from objects is repeated until the quality of the structured light patterns reflected from objects is good enough.

In the above, the non-SL image and the initial test SL images can be captured with individual frame periods. For example, the non-SL image can be captured during a first period and the initial SL image can be captured during a second period. The first period and the second period may be of the same or different lengths. Furthermore, the new SL image may be captured using individual frame period (referred to as a third period). Again, the first period, second period and third period can be of the same or different lengths.

The quality of the structured light patterns reflected from objects depend on how reliable the structured light patterns reflected from objects are in the present of various noises, such as the shot noise from the sunlight, object movement, etc. The quality of the structured light patterns reflected from objects can be measured in various ways, such as signal-to-noise ratio, average or peak signal level of the structured light patterns reflected from objects, etc.

The present invention is intended to be used in various ambient light conditions, including bright sunlight environment. Sometimes, sunlight may be bright and the image sensor exposure time needs to be reduced to prevent saturation. On the other hand, the structured light source has its limitation in terms how high the power can go. Furthermore, the strong sunlight may result in large shot noise and within such short exposure time the structured light may be barely large enough for the image sensor to cause enough electron signals to overcome the shot noise. Most image sensors today on the market support a low spatial resolution mode by combining or binning the pixels of the same color in the neighborhood in the analog domain or digitally. While the binning mode allows operating the image sensor at a higher frame rate with lower spatial resolutions, the binning operation is important in terms of its effect in enhancing signal to noise ratio.

In selecting the non-SL image intensity, there are preferred levels in terms of pixel well capacity of the image sensor for circumstances such as the strong sunlight being present. At the same time, a structured light pattern will be superimposed on top of the non-SL image intensity for capturing the SL-images. For the purpose of emphasizing the point, let's consider only the shot noise. The light energy is to be converted into photons in the pixel potential well of the image sensor. In the equation below, $E_{SL}$ denotes the structured light energy, which corresponds to the product of structured light power intensity $P_{SL}$ and the exposure time $t_e$. The same applies for ambient light energy, $E_A$, which represents energy due to ambient light. Accordingly, $E_a$ is equal to the product of ambient light power $P_A$ and $t_e$. The following equation for SNR (signal to noise ratio), the SNR is larger when $t_e$ is larger. Therefore, the favorable condition should be to allow the pixel potential well be close enough to saturation. Accordingly, the level is preferred to be higher than a target pixel value and the target pixel value should be in a range covering pixel values near the maximum pixel value with some margin to avoid over exposure. For example, for 8-bit sensor outputs, the range can be from 160 to 240 according to one embodiment. For example, the target pixel value can be selected as 200. As is understood, the pixel values vary across the image area. In one embodiment, the pixel values in the central region of the image are used for choosing the exposure time $t_e$. For example, in the facial authentication application for mobile phones, the middle region of the image corresponds to the subject face, which is the target to be processed. In one embodiment, the exposure time $t_e$ is selected so that the histogram of the pixel values in the middle region of the image has the highest values around 210.

$$SNR = \frac{E_{SL}}{\sqrt{E_A + E_{SL}}}$$
$$= \frac{P_{SL}t_e}{\sqrt{P_A t_e + P_{SL}t_e}}$$
$$= \frac{P_{SL}}{\sqrt{P_A + P_{SL}}}\sqrt{t_e}.$$

In order to further improve the quality of the structured light patterns reflected from objects in the FOV of the image sensor, another embodiment of the present invention captures multiple SL images and multiple non-SL images to derive the structured light patterns. The multiple SL and non-SL image are captured with a selected structured light intensity comprising one intensity level increased from a previous intensity level until the quality of the structured light patterns is satisfactory. The multiple SL images in each set do not have to be captured with the same SL light intensity. In other words, the multiple SL images in each set can be captured with different SL intensities. In one embodiment, the structured light intensity can be ramped up from low to high until the quality of the structured light patterns is satisfactory. According to this embodiment, a set of non-SL images are captured without the structured light and a set of SL images are captured with the structured light at a same intensity or at different intensity levels. The structured light patterns derived from multiple SL images and multiple non-SL images should have enhanced signal-to-noise ratio. Accordingly, the quality of the structured light patterns should be improved. The quality of the structured light patterns is checked after each set of SL images is captured at one or more new structured light intensity level. If the quality of the structured light patterns is not good enough, a next set of SL images is captured with the intensity of the structured light increased from a previous level. In this case, only one set of non-SL images is captured. However, multiple sets of SL images may need to be captured, where each set of the SL images is captured with a same structured light intensity or with different SL intensity levels. When different intensity levels are used for each set of SL images, said one or more new SL intensity levels are selected from a range or a group comprising one target intensity level increased from at least one previous intensity level. When the set of SL images uses the same SL intensity, the structured light intensity is increased from a previous set for each new set of SL images. When different intensity levels are used for each set of SL images, at least one of the new SL image is captured with a target intensity lower than at least one previous intensity. The procedure of capturing a new set of SL images with an increased structured light intensity and evaluating the quality of the structured light patterns is repeated until the quality of the structured light patterns is satisfactory.

When multiple SL images and multiple non-SL images are used to derive the structured light patterns, the set of SL images may be combined to form an enhanced SL image. Also, the set of non-SL images may be combined to form an enhanced non-SL image. If there is no motion in the set of SL and non-SL images, the enhanced SL and non-SL images may be derived as the average of the set of SL and non-SL images respectively. However, if there is motion in the set of SL images or the set of non-SL images, the processing should take into account of the motion within the set of SL or non-SL images. Various motion estimation and compensation techniques are known in the field of video processing/compression. These motion estimation and compensation techniques can be applied to the set of SL and non-SL images to compensate the motion before combining these SL or non-SL images. In the case of mobile phone application, the motion in the set of SL and non-SL images may be caused by an unsteady hand holding the mobile phone. In this case, the motion in the multiple SL or non-SL images may be processed using global motion estimation/compensation.

Another technique to alleviate the motion problem is to shorten the period between two consecutive images to capture images in higher rates. Therefore, according to the present invention, a fast capture mode is applied for capturing the set of S image and the set of non-SL images. In the fast mode, the frame period for capturing an image is substantially shortened. For example, the frame period is reduced to ⅛ or less of a regular frame period. If the camera is operated at 30 fps (frames per second), the fast mode corresponds to 240 fps. Therefore, the time difference between a structured light image and a corresponding image without the structured light becomes ½40 second. For such a short time period, the motion between two consecutive images is expected to insignificant.

In U.S. patent application Ser. No. 14/884,788, a single image sensor camera is disclosed to capture structured light image and regular image for human gastrointestinal (GI) tract imaging applications. Since there is no ambient light in the GI environment, the structured light image corresponds to the structured light reflected from the object. Some examples are disclosed in U.S. patent application Ser. No. 14/884,788 to capture the structured light in shortened frame period (i.e., in fast capture more). For example, the image sensor can be configured to operate in a reduced dynamic range by reducing bit depth or spatial resolution of the structured-light image compared to the regular image. Furthermore, the gain in readout circuits of the sensor can be set high to capture the structure light image in shortened frame period.

Figure 2A:
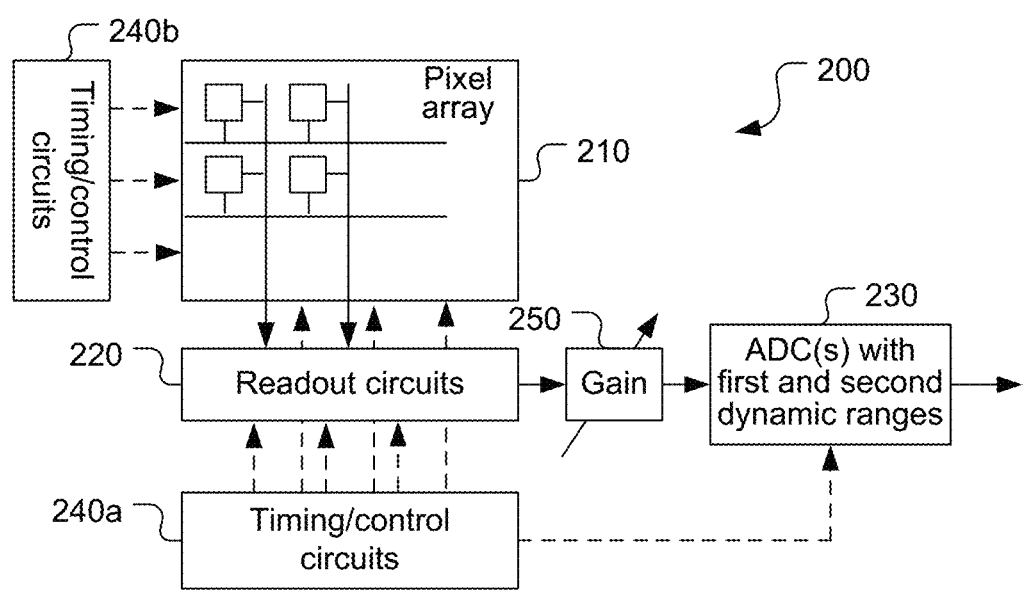
FIG. 2A illustrates a simplified block diagram of an integrated image sensor incorporating an embodiment of the present invention.

FIG. 2A illustrates one example of a simplified block diagram of an integrated image sensor 200 incorporating an embodiment of the present invention. The integrated image sensor comprises a pixel array (210) being responsive to light energy received by the pixel array to produce signal data having a voltage level depending on the light energy received, readout circuits (220) coupled to the pixel array to access the signal data produced by the pixel array, gain control 250 coupled to the readout circuits 220 also includes gain control 250 to adjust the gain of the output signal from the pixel arrays 210, one or more analog-to-digital converters (ADCs, 230) having a first dynamic range and a second dynamic range, and timing/control circuits (240a and 240b). The pixel array may consist of monochrome pixels or color pixels. The pixel array can be based on the CMOS technology or the CCD technology. The output circuits are coupled to the pixel array under the control of the timing/control circuits. For example, the pixel array outputs can be transferred to the output circuits row by row under the control of the timing/control circuits. The output circuits may also include amplifier and CDS circuit, where the CDS circuit is used to take care of the offset in individual pixels after reset. While the timing/control circuits (240a and 240b) are shown as two separate blocks, they may also be implemented as a unified block.

Figure 2B:
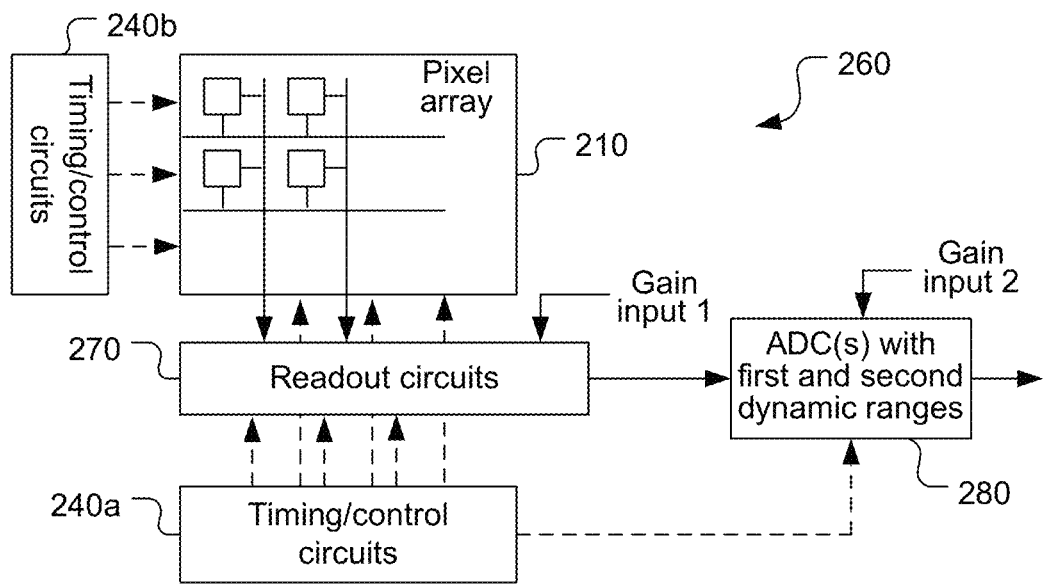
FIG. 2B illustrates a simplified block diagram of an integrated image sensor incorporating an embodiment of the present invention.

FIG. 2B illustrates another example of a simplified block diagram of an integrated image sensor 260 incorporating an embodiment of the present invention. The simplified block diagram of an integrated image sensor 260 is similar to that in FIG. 2A. However, the gain control function is embedded in the readout circuits 270 and ADCs 280, where gain input 1 corresponds to a gain control signal to adjust the output gain of the readout circuits and gain input 2 corresponds to a gain control signal to adjust the gain of ADCs 280.

The ADC circuit(s) is capable of operating at a first dynamic range and a second dynamic range. The first dynamic range is smaller than the second dynamic range. For example, the first dynamic range may correspond to 6 bits and the second dynamic range may correspond to 9 bits. The ADC dynamic range is also referred as ADC resolution or bit depth. In the above example, the ADC supports 6-bit resolution and 9-bit resolution or the bit depth supported by the ADC is 6 bits or 9 bits. Individual ADCs with different dynamic ranges may be used. Since the structured-light image and the regular image are captured in serial instead of parallel, a single ADC with configurable dynamic range may also be used. For example, an adaptively configurable ADC is disclosed in U.S. Pat. No. 8,369,458 issued to Wong et al. on Feb. 5, 2013. The timing/control circuits may include row scan circuit and column scan circuit. The timing/control circuits are also responsible to generate various control signals such as reset signals. In the following, preferred embodiments are provided regarding configuring the image sensor to capture structured-light images and regular images.

In FIG. 2A, the gain control 250 may be set to high so as to reduce the required exposure time. In FIG. 2B, the gain input 1 to the readout circuits 270 and/or the gain input 2 to the ADCs 280 may also be set to high so as to reduce the required exposure time. When structured light is turned on to illuminate the subject, it is desirable to keep the exposure time short and/or to keep the intensity low so as not to cause very noticeable disturbance the subject. Therefore, the gain can be set high in the fast capture mode. However, if ambient light (e.g. sunlight) is strong, the gain needs to be set to an appropriate lower level to avoid pixel values in saturation and the structure light needs to be sufficiently stronger than the shot noise due to strong ambient light.

Reducing the sensor spatial resolution can also help to increase frame rate (i.e., reducing the frame capture time). The reduced spatial resolution can be achieved by subsampling or binning. The subsampling technique simply skipping pixels in the horizontal and/or vertical direction so that an image frame can be quickly read out. As mentioned earlier, pixel binning is another technique to increase frame rate by reducing the spatial resolution. Pixel binning combines the charges from multiple pixels horizontally and/or vertically in the analog or digital domain. It not only increases frame rate, but also increases the signal-to-noise ratio (SNR) of the captured image. Currently, both reduced spatial resolution techniques are available in various commercial image sensor products.

Upon capturing a set of fast-mode SL images and a set of fast-mode non-SL images, the structured light patterns reflected from the object can be determined from the set of fast-mode SL images and the set of fast-mode non-SL images, and 3D information, such as the shape or depth, associated with the object can be derived. In an embodiment mentioned earlier, a set of non-SL images is captured without structured light and sets of SL images are captured by selecting structured light intensities including one intensity level increased from a previous intensive level until the quality of the structured light patterns is satisfactory. For example, the structured light intensities selected correspond to successively increasing structured light intensities. The fast capture mode can be applied to the embodiment by capturing a set of fast-mode non-SL images captured without structured light and capturing sets of fast-mode SL images by successively increasing structured light intensities until the quality of the structured light patterns is satisfactory.

Figure 3:
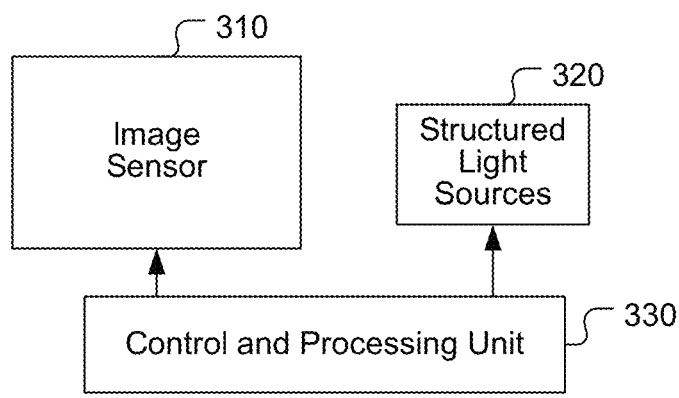
FIG. 3 illustrates an exemplary block diagram of an apparatus incorporating an embodiment of the present invention to capture images with and without the structured light and regular images using the same image sensor.

An exemplary apparatus for implementing the above embodiment is shown in FIG. 3, where the apparatus comprises an integrated image sensor 310, structured light sources 320 and control processor 330. Other components required for a camera system, such as optical lens and flash light are not shown in FIG. 3. The integrated image sensor as shown in FIG. 2A or FIG. 2B may be used as the image sensor 310 in FIG. 3. While only the structured light sources 320 are shown in FIG. 3, it is understood that other components, such as a transparency with selected patterns and optics to project the patterns (not shown in FIG. 3), are also needed. Control and processing unit 330 is incorporated to provide the needed control signals, such as setting the image sensor to the fast-capture mode for capturing the fast-mode images in order to derive the 3D information. Also, control and processing unit 330 controls the operations of the structured light sources such as whether to turn on/off and when to turn on/off the structured light sources 320. The control and processing unit 330 may also be responsible for deriving the 3D information based on the captured fast-mode images. For mobile phone applications, there is always a powerful processing unit (e.g. Application Processor) within the mobile phone. The mobile phone processing unit can be programmed to perform the above tasks. Furthermore, it is desirable to use the same image sensor for capturing the fast-mode images as well as regular images. Therefore, the image sensor or image sensors in the mobile phone can be retrofitted to capture the fast-mode images as well as regular images. Regarding the structured light module with the structured light sources, the structured light module will be an additional component to the conventional mobile phone since there is no need for the structured light module in the conventional mobile phone.

As mentioned previously, in some environments, the sunlight may be strong. In order to derive reliable structured light patterns, a set of non-SL images without structured light and multiple sets of SL images with successively increasing structured light intensities are captured. The set of non-SL images can be combined to form an enhanced non-SL image. Similarly, each set of SL images can be combined to form an enhanced SL image. As mentioned before, by combining the multiple images of the same type (i.e., SL or non-SL) can enhance image signal-to-noise ratio, which is useful to cope with various noised such as shot noise and quantization noise. Upon the enhanced SL image and enhanced non-SL image derived, structured light patterns can then be derived from the enhanced SL image and enhanced non-SL image. For example, the structured light patterns can be derived by subtracting the enhanced non-SL image from the enhanced SL image. The enhanced SL image may correspond to the average of the set of SL images and the enhanced non-SL image may correspond to the average of the set of non-SL images. However, other methods may also be used to derive the enhanced SL/non-SL image based on the set of SL/non-SL images respectively. For example, outlier rejection can be applied to remove some extreme samples before or during combining multiple SL or non-SL images. In another example, instead of averaging, median filter can be applied to the multiple SL images to derive the enhanced SL image. Similarly, the median filter can be applied to the multiple non-SL images to derive the enhanced non-SL image. However, the structured light patterns can be derived from the set of SL images and the set of SL images jointly without the need for deriving the enhanced SL image from the set of SL images and deriving the enhanced non-SL image from the set of non-SL images.

In the following, an example to capture a set of non-SL images and one or more sets of SL images with successively increased structured light intensities:

1. Capture, by the sensor, M non-SL images formed on a common image plane of the camera, where M≥1.
2. Capture, by the sensor, N initial SL images formed on the common image plane of the camera with the structured light set to an initial intensity level, where N≥1.
3. Derive structured light patterns reflected from objects in the field of view of the image sensor based on the M non-SL images and the N initial SL images.
4. Check the quality of the structured light patterns. If the quality is satisfactory, STOP; otherwise perform steps 5a-5c.
5a. Capture, by the sensor, N next SL images formed on the common image plane of the camera with the structured light set to a fixed intensity level for the N next SL images, where the fixed intensity level is higher than a previous intensity level,
5b. Derive structured light patterns reflected from objects in the field of view of the image sensor based on the M non-SL images and the N next SL images, and
5c. Go to step 4.

As mentioned before, the current application is intended for an environment that the structured light will not cause very noticeable disturbance to the subject being photographed. Therefore, the intensity of the structured light should be properly adjusted so that the structured light will project sufficient structured light patterns for deriving 3D information of the subject. In the above example, the structured light intensity is increase from an initial low level successively until reliable structured light patterns can be derived. The initial low level is intentionally set low to ensure that the structured light will not disturb the subject. However, this will have a drawback since it may take more steps (i.e., more time) to ramp up the structured light to a desired intensity level. In order to speed up the structured light setting, an embodiment of the present invention utilizes other useful information that may be available in the camera for other purposes. For example, ambient light sensor is being used in some mobile phones. With the known ambient light, the initial structured light level can be properly selected to speed up the process of identifying the minimum required structured light level to obtain reliable structured light patterns. In another example, the mobile phone may have a rough distance measure such as a proximity sensor or other distance measuring devices. Such device can provide an indication of an object to the sensor. Accordingly, an embodiment can determine a proper initial structured light level based on the intensity of one or more non-SL images and the object distance so as to speed up the process of identifying the minimum required structured light level to obtain reliable structured light patterns.

In yet another embodiment, the mobile device comprises light sources having different emission spectra or wavelengths and the light sources can be selectively turned on/off or adjusted to change intensity so as to generate target spectral characteristics. On the other hand, the color image sensor has multiple color planes, each comprising pixels that have like color filters. It is desirable to adjust the structured light sources to maximize the structured light to ambient-light signal ratio among the color planes of the color image sensor. The maximum structured light to ambient-light signal ratio can be estimated based on one non-SL image and multiple SL images with the structured light adjusted to generate different spectral lights. A setting that results in the maximum structured light to ambient-light signal ratio is selected for capturing other SL images.

In order to determine the best combined light spectra to extract more reliable differences between the SL image and the non-SL image, different settings of the light sources may be checked to select a best one. In another embodiment of the present invention, a non-SL image is captured first and the color characteristics of the non-SL image are evaluated. For example, an object may correspond to the subject face, which includes mostly skin tones. If the structured light sources can be adjusted to generate target spectrum that may cause more distinct SL color from the majority colors of the non-SL image. Accordingly, in yet another embodiment of the present invention, the color information of the test image is evaluated. The structured lights are set according to conditions including evaluated color of the first image. For example, in the case of human face being the object in the test image, the structured light sources will be adjusted to generate a target spectrum with higher spectral density around the blue color which is close to a complementary color of the skim tone. In one embodiment only blue pixel is read out to speed up the operation.

Figure 4:
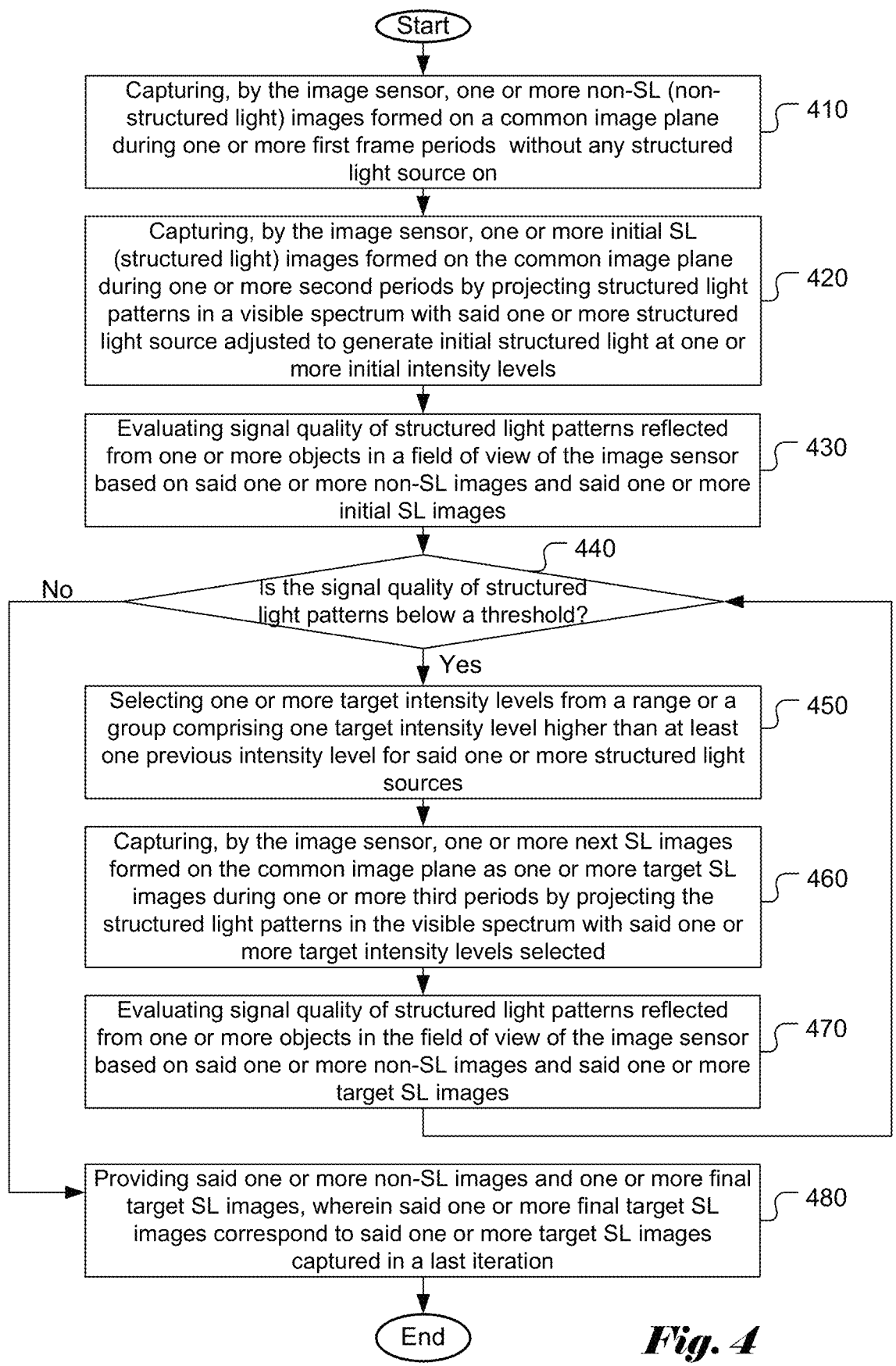
FIG. 4 illustrates an exemplary flowchart for capturing a set of non-SL images without the structured light and one or more sets of SL images with successively increasing structured light intensities according to an embodiment of the present invention.

FIG. 4 illustrates an exemplary flowchart for capturing a set of non-SL images without the structured light and one or more sets of SL images with successively increasing structured light intensities according to an embodiment of the present invention. According to this method, one or more non-SL (non-structured light) images formed on a common image plane are captured using the image sensor during one or more first frame periods without any structured light source on in step 410. One or more initial SL (structured light) images formed on the common image plane are captured by the image sensor during one or more second periods by projecting structured light patterns in a visible spectrum with said one or more structured light source adjusted to generate initial structured light at an initial intensity level in step 420. Signal quality of structured light patterns reflected from one or more objects in a field of view of the image sensor is evaluated based on said one or more non-SL images and said one or more initial SL images in step 430. As mentioned before, while a single non-SL image and a single SL image can be captured; multiple non-SL images and multiple SL images will provide better performance for deriving the structured light patterns. Whether the signal quality of structured light patterns is below a threshold is checked in step 440. If the result is asserted (i.e., the "yes" path from step 440 corresponding to the signal quality of structured light patterns being below a threshold), steps 450 to 470 are repeated until the signal quality of structured light patterns is equal to or above the threshold. If the result of step is negative (i.e., the "no" path from step 440 corresponding to the signal quality of structured light patterns being equal to or above the threshold), the process goes to step 480. In step 450, a target intensity level is selected from a range or a group comprising one target intensity level increased from a previous intensity level for said one or more structured light sources In step 460, one or more next SL images formed on the common image plane are captured using the image sensor as one or more target SL images during one or more third periods by projecting the structured light patterns in the visible spectrum with the target intensity level selected. In step 470, the signal quality of structured light patterns reflected from one or more objects in the field of view of the image sensor is evaluated based on said one or more non-SL images and said one or more target SL images. After step 470, the process goes to step 440 again to check the signal quality of structured light patterns. In step 480, said one or more non-SL images and one or more final target SL images are provided as output for deriving depth information, where said one or more final target SL images correspond to said one or more target SL images captured in a last iteration.

The invention may be embodied in other specific forms without departing from its spirit or essential characteristics. The described examples are to be considered in all respects only as illustrative and not restrictive. Therefore, the scope of the invention is indicated by the appended claims rather than by the foregoing description. All changes which come within the meaning and range of equivalency of the claims are to be embraced within their scope.

The invention claimed is:
1. A method of capturing images of a scene using a camera comprising an image sensor and one or more structured light sources, the method comprising:
   capturing, by the image sensor, one or more non-SL (non-structured light) images formed on a common image plane during one or more first frame periods without any structured light source on;
   capturing, by the image sensor, one or more initial SL (structured light) images formed on the common image plane during one or more second periods by projecting structured light patterns in a visible spectrum with said one or more structured light source adjusted to generate initial structured light at one or more initial intensity levels;
   evaluating signal quality of the structured light patterns reflected from one or more objects in a field of view of the image sensor based on said one or more non-SL images and said one or more initial SL images;
   if the signal quality of the structured light patterns is below a threshold, repeating following steps until the signal quality of the structured light patterns is equal to or above the threshold:
      selecting one or more target intensity levels from a range or a group comprising one target intensity level increased from at least one previous intensity level for said one or more structured light sources;
      capturing, by the image sensor, one or more next SL images formed on the common image plane as one or more target SL images during one or more third periods by projecting the structured light patterns in the visible spectrum with said one or more target intensity levels selected; and evaluating signal quality of the structured light patterns reflected from one or more objects in the field of view of the image sensor based on said one or more non-SL images and said one or more target SL images; and providing said one or more non-SL images and one or more final target SL images, wherein said one or more final target SL images correspond to said one or more target SL images captured in a last iteration.

2. The method of claim 1, further comprising capturing, by the image sensor, a regular image formed on the common image plane using the image sensor during a regular frame period by setting the image sensor to a regular mode without any structured light source on, wherein first lengths of said one or more first frame periods, said one or more second periods and said one or more third periods are substantially shorter than a second length of the regular frame period.

3. The method of claim 2, wherein said first lengths of said one or more first frame periods, said one or more second periods and said one or more third periods are equal to or less than ⅛ of the second length of the regular frame period.

4. The method of claim 2, wherein the image sensor is set to a fast-capture mode during capturing said one or more non-SL images, said one or more initial SL images and said one or more next SL images to cause first lengths of said one or more first frame periods, said one or more second periods and said one or more third periods substantially shorter than the second length of the regular frame period.

5. The method of claim 4, wherein the fast-capture mode corresponds to reducing bit depth associated with analog-to-digital converter (ADC) of the image sensor or spatial resolution, or increasing readout gain of the image sensor with reference to a regular mode.

6. The method of claim 1, wherein said one or more non-SL images, said one or more initial SL images and said one or more next SL images are captured with reduced spatial resolution of the image sensor by setting the image sensor to reduce spatial resolution by binning neighboring sensor pixels of a same color in an analog domain, or performed digitally either inside or outside the image sensor.

7. The method of claim 1, wherein said evaluating the signal quality of the structured light patterns reflected from one or more objects in a field of view of the image sensor comprises evaluating signal-to-noise ratio, average signal or peak signal of the structured light patterns reflected from one or more objects in a field of view of the image sensor.

8. The method of claim 1, wherein said one or more structured light sources comprise multiple light sources with different spectral densities, and said multiple light sources are adjusted to maximize structured light to ambient-light signal ratio among color planes of the image sensor.

9. The method of claim 1, wherein said one or more initial intensity levels are determined according to image intensities of said one or more non-SL images and distance information between the camera and a target object detected by a distance sensor.

10. The method of claim 1 wherein said one or more initial intensity levels are determined according to ambient light information from an ambient light sensor and distance information.

11. The method of claim 1, further comprising applying averaging, median filter or outlier rejection to said one or more non-SL images to derive an enhanced non-SL image, applying averaging, median filter or outlier rejection to said one or more initial SL images to derive an enhanced initial SL image and applying averaging, median filter or outlier rejection to said one or more target SL images to derive an enhanced SL image.

12. The method of claim 11, wherein the signal quality of the structured light patterns reflected from one or more objects in the field of view of the image sensor is evaluated based on the enhanced non-SL image and the enhanced initial SL image, or based on the enhanced non-SL image and the enhanced SL image.

13. The method of claim 12, further comprising deriving depth information for one or more objects in the field of view of the image sensor based on differences between the enhanced non-SL image and the enhanced SL image.

14. The method of claim 1, further comprising determining an exposure time for said capturing, by the image sensor, said one or more non-SL images, wherein the exposure time is determined to cause a highest pixel value, after outliers removed, for pixels around a middle region of said one or more non-SL images is equal to or greater than a target pixel value.

15. The method of claim 14, the target pixel value is in a range from 160 to 240 for the image sensor with 8-bit outputs.

16. An apparatus for capturing images of a scene using a camera, the apparatus comprising:

an image sensor;

one or more structured light sources;

one or more processors coupled to the image sensor and said one or more structured light sources, wherein said one or more processors are configured to:

capture, by the image sensor, one or more non-SL (non-structured light) images formed on a common image plane during one or more first frame periods without any structured light source on;

capture, by the image sensor, one or more initial SL (structured light) images formed on the common image plane during one or more second periods by projecting structured light patterns in a visible spectrum with said one or more structured light source adjusted to generate initial structured light at one or more initial intensity levels;

evaluate signal quality of the structured light patterns reflected from one or more objects in a field of view of the image sensor based on said one or more non-SL images and said one or more initial SL images;

if the signal quality of the structured light patterns is below a threshold, repeating following steps until the signal quality of the structured light patterns is equal to or above the threshold:

select one or more target intensity levels from a range or a group comprising one target intensity level increased from at least one previous intensity level for said one or more structured light sources;

capture, by the image sensor, one or more next SL images formed on the common image plane as one or more target SL images during one or more third periods by projecting the structured light patterns in the visible spectrum with said one or more target intensity levels selected; and evaluate signal quality of the structured light patterns reflected from one or more objects in the field of view of the image sensor based on said one or more non-SL images and said one or more target SL images; and provide said one or more non-SL images and one or more final target SL images, wherein said one or more final target SL images correspond to said one or more target SL images captured in a last iteration.

17. The apparatus of claim 16, wherein said one or more processors are configured to capture, by the image sensor, a regular image formed on the common image plane using the image sensor during a regular frame period by setting the image sensor to a regular mode without any structured light source on, wherein first lengths of said one or more first frame periods, said one or more second periods and said one or more third periods are substantially less than a second length of the regular frame period.

18. The apparatus of claim 17, wherein the first lengths of said one or more first frame periods, said one or more second periods and said one or more third periods are equal to or less than 1/8 of the second length of the regular frame period.

19. The apparatus of claim 16, wherein the image sensor is set to a fast-capture mode during capturing said one or more non-SL images, said one or more initial SL images and said one or more next SL images to cause said one or more first frame periods, first lengths of said one or more second periods and said one or more third periods substantially shorter than a second length of the regular frame period.

20. The apparatus of claim 19, wherein the fast-capture mode corresponds to configuring said one or more processors to reduce bit depth associated with analog-to-digital converter (ADC) of the image sensor or spatial resolution, or increasing readout gain of the image sensor with reference to a regular mode.

21. The apparatus of claim 16, wherein said one or more non-SL images, said one or more initial SL images and said one or more next SL images are captured with reduced spatial resolution of the image sensor by setting the image sensor to reduce spatial resolution by binning neighboring sensor pixels of a same color in an analog domain, or performed digitally either inside or outside the image sensor.

22. The apparatus of claim 16, wherein the signal quality of the structured light patterns reflected from one or more objects in a field of view of the image sensor is evaluated according to signal-to-noise ratio, average signal or peak signal of the structured light patterns reflected from one or more objects in a field of view of the image sensor.

23. The apparatus of claim 16, wherein said one or more initial intensity levels are determined according to image intensities of said one or more non-SL images and distance information between the camera and a target object detected by a distance sensor.

24. The apparatus of claim 16, wherein said one or more structured light sources comprise multiple light sources with different spectral densities, and said multiple light sources are adjusted to maximize structured light to ambient-light signal ratio among color planes of the image sensor.

25. The apparatus of claim 16, wherein said one or more initial intensity levels are determined according to ambient light information from an ambient light sensor and distance information.

26. The apparatus of claim 16, wherein said one or more processors are configured to apply averaging, median filter or outlier rejection to said one or more non-SL images to derive an enhanced non-SL image, to apply averaging, median filter or outlier rejection to said one or more initial SL images to derive an enhanced initial SL image and to apply averaging, median filter or outlier rejection to said one or more target SL images to derive an enhanced SL image.

27. The apparatus of claim 26, wherein the signal quality of the structured light patterns reflected from one or more objects in the field of view of the image sensor is evaluated based on the enhanced non-SL image and the enhanced initial SL image, or based on the enhanced non-SL image and the enhanced SL image.

28. The apparatus of claim 27, wherein said one or more processors are configured to derive depth information for one or more objects in the field of view of the image sensor based on differences between the enhanced non-SL image and the enhanced SL image.

29. The apparatus of claim 16, wherein said one or more processors are configured to determine an exposure time for said capturing, by the image sensor, said one or more non-SL images, wherein the exposure time is determined to cause a highest pixel value, after outliers removed, for pixels around a middle region of said one or more non-SL images is equal to or greater than a target pixel value.

30. The apparatus of claim 29, the target pixel value is in a range from 160 to 240 for the image sensor with 8-bit outputs.

* * * * *